(12) United States Patent
Russell

(10) Patent No.: US 6,643,942 B1
(45) Date of Patent: Nov. 11, 2003

(54) MULTI-PURPOSE LEVELING AND MARKING TOOL FOR MOUNTING CABINETS, SHELVES AND THE LIKE UPON A VERTICAL WALL SURFACE

(76) Inventor: Michael R. Russell, 997 S. Lakeshore Dr., Lake City, MI (US) 49651

( * ) Notice: Subject to any disclaimer, the term of this patent is extended or adjusted under 35 U.S.C. 154(b) by 0 days.

(21) Appl. No.: 10/163,066

(22) Filed: Jun. 5, 2002

(51) Int. Cl.[7] .................................................. B43L 7/10
(52) U.S. Cl. .................................... 33/459; 33/452
(58) Field of Search .................... 33/374, 375, 418, 33/451, 452, 456, 458, 459, 194, 528, 535, 613, 562

(56) References Cited

U.S. PATENT DOCUMENTS

| | | | | |
|---|---|---|---|---|
| 1,106,232 A | * | 8/1914 | McFarland | 33/458 |
| 1,134,826 A | * | 4/1915 | Eckre | 33/451 |
| 1,442,136 A | * | 1/1923 | Eads | 33/194 |
| 1,908,518 A | * | 5/1933 | Lee | 33/451 |
| 2,691,829 A | * | 10/1954 | Arana | 33/374 |
| 3,371,423 A | | 3/1968 | Paul | |
| 3,522,657 A | * | 8/1970 | Metrulis | 33/342 |
| 3,921,306 A | | 11/1975 | Provi | 33/379 |
| 4,212,108 A | | 7/1980 | Jackson | |
| 4,317,289 A | | 3/1982 | Conn | 33/498 |
| 4,381,607 A | | 5/1983 | Place | 33/1 G |
| 4,443,949 A | | 4/1984 | Newton | |
| 4,531,301 A | | 7/1985 | Tau | 33/382 |
| 4,607,437 A | | 8/1986 | McSorley, Sr. et al. | 33/374 |
| 5,088,205 A | | 2/1992 | Egbert | 33/371 |
| 5,131,164 A | | 7/1992 | Miller | 33/613 |
| 5,269,066 A | | 12/1993 | Walters | 33/451 |
| 5,339,530 A | | 8/1994 | Wright | 33/427 |
| 5,367,783 A | | 11/1994 | Nygren | 33/613 |
| 5,412,875 A | | 5/1995 | Hilderbrandt | 33/374 |
| 5,433,011 A | | 7/1995 | Scarborough et al. | 33/376 |
| 5,459,935 A | | 10/1995 | Paulson et al. | 33/451 |
| 5,933,973 A | | 8/1999 | Fenley, Jr. | 33/451 |
| 6,029,362 A | | 2/2000 | Miodragovic | 33/666 |
| 6,041,510 A | | 3/2000 | Huff | 33/374 |
| 6,049,991 A | | 4/2000 | Gruenberg et al. | 33/613 |
| 6,105,266 A | | 8/2000 | Cote | 33/451 |
| 6,279,240 B1 | | 8/2001 | Bonaventura, Jr. | 33/374 |
| 6,293,023 B1 | | 9/2001 | Schooley | 33/374 |
| 6,293,028 B1 | | 9/2001 | Sylvia | 33/613 |
| 6,305,092 B1 | | 10/2001 | Tufariello | 33/371 |
| 6,305,093 B1 | | 10/2001 | Venola | 33/451 |
| 6,314,652 B1 | | 11/2001 | English | 33/421 |

* cited by examiner

Primary Examiner—Christopher W. Fulton
(74) Attorney, Agent, or Firm—Gifford, Krass, Groh, Sprinkle, Anderson & Citkowski, P.C.

(57) ABSTRACT

A combination leveling and marking tool for use in establishing wall support locations existing underneath a wall covering material such as dry wall or wall board material. The tool includes a central elongate extending portion having a first end and a second end and first and second elongate extending wing portions pivotally secured to the opposite ends of the central portion. The central portion and the wing portions each exhibit an opposing surface within which is defined individual pluralities of semi-circular shaped recesses. The wing portions establish a first folded position against the central portion and in which the pluralities of semi-circular recesses align to establish an extending row of circular apertures which are adapted to receive a mounting fastener in inserting fashion therethrough. The wing portions are further capable of being pivoted to a second unfolded position in which the wing portions are established in substantially perpendicular extending fashion relative to the central portion.

16 Claims, 4 Drawing Sheets

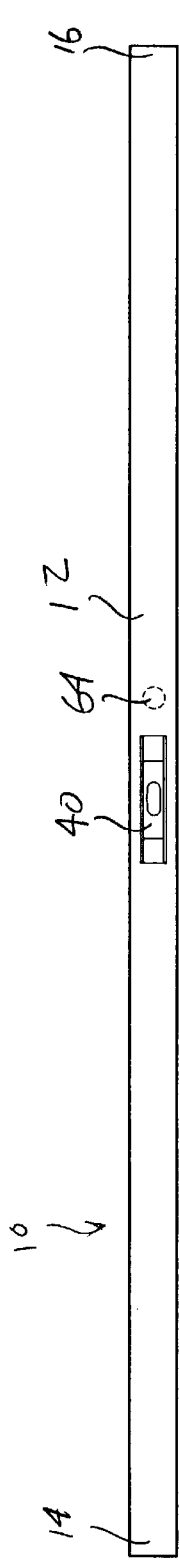
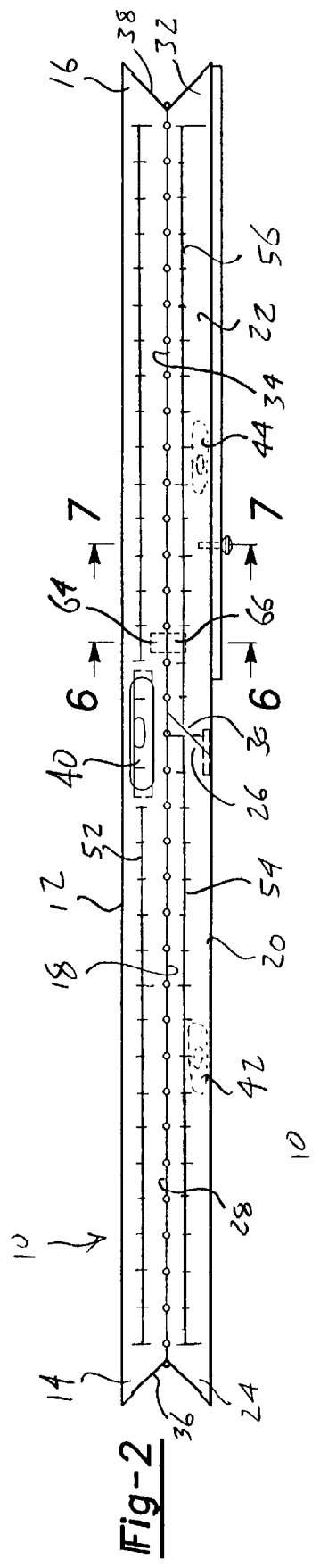
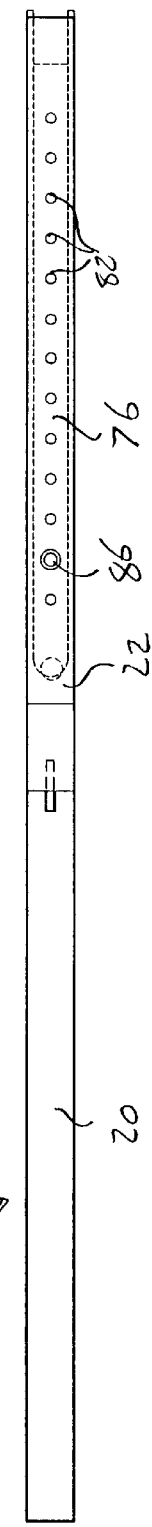
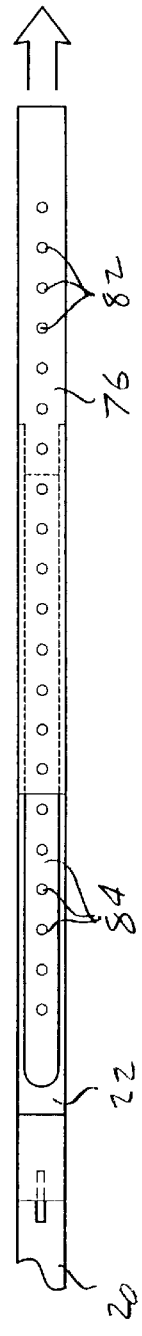
Fig-1
Fig-2
Fig-3
Fig-4

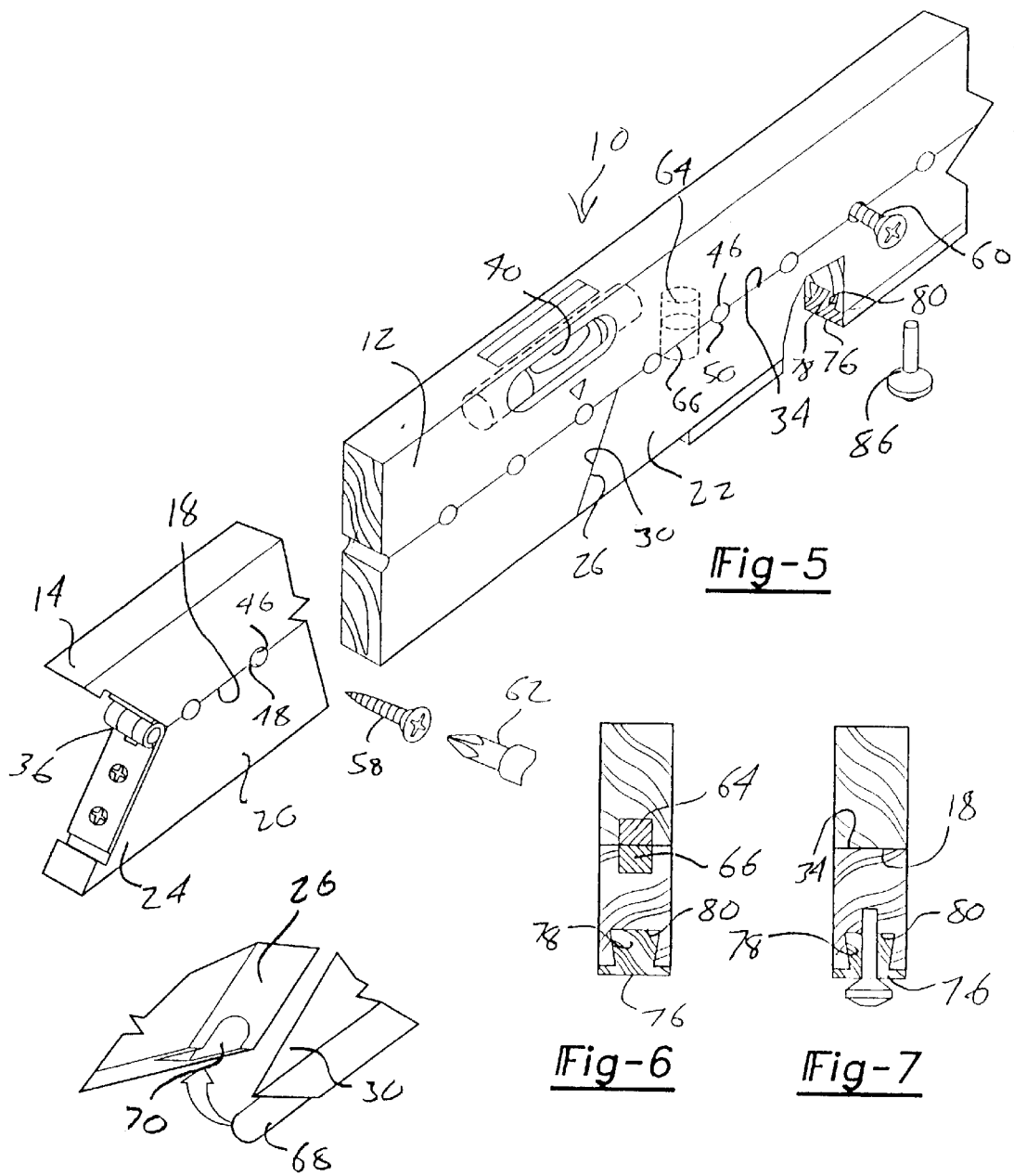
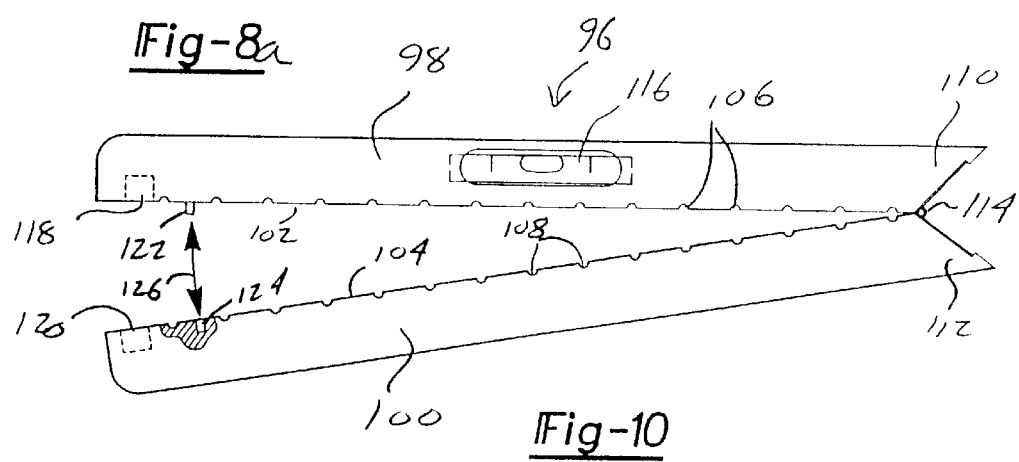

MULTI-PURPOSE LEVELING AND MARKING TOOL FOR MOUNTING CABINETS, SHELVES AND THE LIKE UPON A VERTICAL WALL SURFACE

BACKGROUND OF THE INVENTION

1. Field of the Invention

The present invention relates generally to leveling and marking tool devices. More specifically, the present invention teaches a combination leveling and marking tool for measuring and marking both horizontal and vertical locations for mounting cabinets, shelves and the like. The present invention is further particularly suited for locating the proper positions for mounting fasteners such as screws or fasteners to engage structural stud members hidden underneath wall covering or wall board material. An additional feature of the invention is that it allows the screw or fastener to be started through the wall covering material and into the stud with the tool remaining in place.

2. Description of the Prior Art

The prior art is well documented with examples of wall marking and alignment devices for use in particular establishing leveling or centering points for such as the attachment of fasteners. A first example of this is set forth in U.S. Pat. No. 6,029,362, issued to Miodragovic, which teaches an article for aligning and establishing fastening points for such as nails, pegs and hooks, for the arrangement and hanging of pictures and picture frames, as well as for marking fastening points at either selected horizontal or vertical distance. The alignment article includes at least one bubble level mounted in a frame, with a cursor having a first borehole guided along the frame. The first borehole is guided along the frame so that it overlays a slit designed in the frame and running parallel to the longitudinal edges. At least one further borehole is situated at one of the ends of the frame.

U.S. Pat. No. 6,305,093, issued to Venola, teaches a hanger tool for facilitating centering and hanging of a component. The tool includes a linear rail having a centering scale on one edge and including numerals ascending upwardly in opposite directions from a centering point. A measurement scale has incremental spaces twice the size of the spacing on the centering scale and including the opposite edge of the rail. Leveling bubbles are incorporated on the scale and which may also include a hand grasp.

U.S. Pat. No. 5,933,973, issued to Fenley, Jr., teaches an elongate rule having a row of calibration marks placed thereon and preferably a second row reading from the opposite end and a set of nail holes at spaced distances therein. The nail holes extend either on the centerline or along one edge of the ruler. The ruler extends through a housing by means of a slot defined therethrough. An alignment surface in the housing assures alignment of the housing with respect to the ruler and the housing supports a first bubble level responsive to the horizontal and a second bubble level at a right angle to enable the ruler and housing to be positioned vertically. Thus, the housing and ruler enable ruler movement while making measurements along the wall.

U.S. Pat. No. 4,443,949, issued to Newton, teaches a picture-hanging template specially constructed for use in hanging wall-supported members, such as framed pictures, paintings and the like. The template comprises an elongated body including two mirror imaged arrays of closely spaced holes distributed symmetrically on opposite sides of the longitudinal center of the template and in association with corresponding indicia to indicate the spacing of each hole from the center. The template is used to mark a wall-supported member and the wall at corresponding aligned locations so that specially configured two-part fasteners may be secured to the wall supported member and the wall in positions for mating alignment thereby permitting the wall-supported member to be hung in a stable manner and in a desired position on the wall.

Finally, U.S. Pat. No. 3,371,423, issued to Paul, teaches a measuring device for marking a point for the installation of fasteners such as is required when hanging drapes around a window. In relevant part, Paul includes an alignment bar adapted to be placed flush against the side of a window, an elongate bar extending parallel to the window frame and means on the elongate bar forming a plurality of apertures through which the position for the bracket fasteners may be marked. When the measurement device is placed beside a window, a pencil or other suitable marking element may be used to inscribe a dot on the wall where the bracket fasteners will be positioned. The marking element is disclosed as further being a drill inserted through the apertures to form a pilot hole for receiving the bracket fasteners.

SUMMARY OF THE PRESENT INVENTION

The present invention is a combination leveling and marking tool for measuring and marking both horizontal and vertical locations for mounting cabinets, shelves and the like. As discussed previously, the present invention is particularly suited for locating the proper positions of studs extending beneath a wall covering surface and such as for mounting fasteners, i.e., screws to the studs. A feature of the invention is that it allows the screw or fastener to be started, through the wall covering material and into the stud, with the combination leveling and locating tool remaining in place. The present invention also provides the ability to mark an underlying stud location and, by virtue of the incremental spacing characteristics established by the tool, to estimate the position of a succeeding wall stud, such as are typically arranged at 18" or 24" on center intervals.

The tool includes a central elongate extending portion having a first end and a second end and which is constructed in substantially rectangular and elongate extending fashion. First and second elongate extending wing portions each also include a substantially rectangular configuration and are pivotally secured to the opposite ends of the central portion, such as through the provision of hinges. In the preferred variant, level indicators are built into at least the central portion and either one or both of the extending wing portions.

The central portion and the wing portions each exhibit an opposing surface within which is defined an individual plurality of semi-circular shaped recesses. The wing portions establish a first folded position against the central portion and in which the pluralities of semi-circular recesses, such as which may define a scale of one inch increments, align to establish an extending row of circular apertures adapted to receive a mounting fastener in inserting fashion therethrough. The folded attraction established between the wing portions and the central extending portion is assisted through the use of magnets as well as pin and slot engagement, as well as by an angularly configured and mating arrangement of the associated wing portion end surfaces, and thus permits the screw or other fastener to be inserted through a selected aperture and started into the wall surface, with the combination tool remaining in place.

The wing portions are further capable of being pivoted to a second unfolded position, in which the wing portions are established in substantially perpendicular extending fashion relative to the central portion. In this fashion, perpendicularly arrayed wing portion(s) function to provide an additional extending surface to mark such as vertical dimensions of a hidden wall stud or suitable wall support.

A scale is secured in channeled fashion along a selected one of the extending wing portions. Upon arraying the selected wing portion in its perpendicular extending fashion, the scale may be extended to incrementally adjustable positions and such as to define a set distance between the central extending portion and a ceiling surface.

A further variant of the tool includes the provision of first and second elongate extending and pivotally secured portions, each of which again exhibits opposing surfaces within which are defined the individual pluralities of semi-circular shaped recesses. The elongate portions establish a first folded position in which the pluralities of semi-circular recesses align to establish an extending row of circular apertures adapted to receive a mounting fastener in inserting fashion therethrough. The portions are further pivotable relative to each other in the fashion previously described and to a second unfolded position in which the portions are established in substantially perpendicular extending fashion relative to one another. An ideal application for this variant of the tool is for use in such as the inside of a cabinet and in order to mark locations for the placement of shelving portions and the like.

BRIEF DESCRIPTION OF THE DRAWINGS

Reference will now be made to the attached drawing illustrations, when read in combination with the following detailed description, wherein like reference numerals refer to like parts throughout the several views, and in which:

FIG. 1 is a top view of the combination leveling and marking tool according to a first preferred embodiment of the present invention;

FIG. 2 is a front view of the leveling and marking tool and illustrating the central leveling portion and first and second pivotally secured wing portions in a first folded and contracted position according to the present invention;

FIG. 3 is a bottom view of the combination leveling and marking tool illustrated in FIGS. 1 and 2 and further showing an extensible scale in a first retracted position within a selected one of the pivotal wing portions;

FIG. 4 is a sectional view of a right side portion of the marking tool illustrated in FIG. 3 and further showing the scale in its extending position;

FIG. 5 is perspective illustration, in partially reduced fashion, of a slightly modified leveling and marking tool with magnetic retention members for retaining the wing portions in their inwardly folded position, and which also illustrates the manner in which a screw is started through a selected pair of semi circular edge apertures defined between the folded central and wing portions;

FIG. 6 is a cutaway view taken along line 6—6 in FIG. 2 and illustrating the magnetic attracting elements in arrayed and opposing fashion between the central portion and selected pivotally secured wing portion, as well as the channeled engagement established between the wing portion and extensible scale;

FIG. 7 is a further cutaway view taken along line 7—7 in FIG. 2 and illustrating the dowel pin for engaging through aligning apertures defined between the wing portion and extensible scale;

FIG. 8a is a partial illustration of a portion of the interconnecting structure established between the first and second wing portions in the first preferred embodiment and in the form of an axially extending pin extending from a first selected wing and engageable within a slotted portion defined within the second selected wing;

FIG. 10 is a plan view, in partially opened fashion, of a further embodiment of the combination leveling and marking tool having first and second pivotally connecting portions and which is particularly suited such as for use inside a cabinet and in order to mark locations for the installation of shelving portions.

DETAILED DESCRIPTION OF THE PREFERRED EMBODIMENTS

Figure 8B:
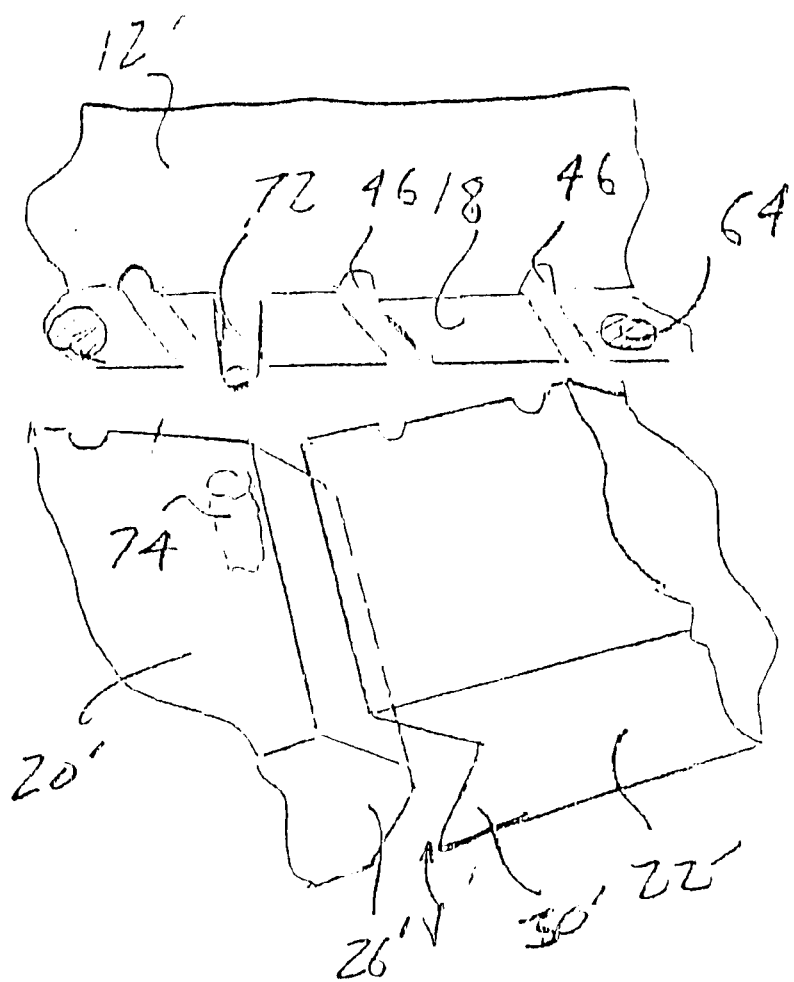
FIG. 8b is a partial illustration, similar to that shown in FIG. 8, and illustrating a portion of the interconnecting structure established between the first and second wing portions according to a further preferred embodiment and in the form of alternatively configured and opposing end surfaces of the wing portions, combined with a downwardly pin extending from the central potion and seating within a recess channel defined in a selected wing portion.

Referring now to the drawings, in particular FIGS. 1–3, 5 and 9, a combination leveling and marking tool is illustrated at 10 for measuring and marking both horizontal and vertical locations for mounting cabinets, shelves and the like to a vertically extending wall surface (not shown). As has also been previously explained, the present invention provides the ability to mark an underlying stud location and, by virtue of the incremental spacing characteristics established by the tool, to estimate the position of a succeeding wall stud, such as are typically arranged at 18" or 24" on center intervals. The present invention is particularly suited for locating the proper positions of studs extending beneath a wall covering surface and such as for mounting fasteners, i.e., screws to the studs and in order to allow the screw or fastener to be started, through the wall covering material and into the stud, with the combination leveling and locating tool remaining in place.

The tool includes a central elongate extending portion 12 having a first end 14 and a second end 16. In the preferred embodiment, the central elongated portion 12 is constructed in substantially rectangular and elongate extending fashion, of a durable material such as a wood or plasticized composition, and includes a bottom facing and opposing surface 18. First 20 and second 22 elongate extending wing portions are provided and each also include a substantially rectangular configuration. The first wing portion 20 includes first 24 and second 26 opposite ends, as well as an upwardly facing and opposing surface 28. The second wing portion 22 likewise includes first 30 and second 32 opposite ends and an upwardly facing and opposing surface 34.

Opposing ends 26 and 30 of the wing portions 20 and 22 are configured in an angularly configured and mating fashion, as illustrated, and as are the opposite ends 24 and 32 which are pivotally secured, such as by hinges 36 and 38, to the opposite ends 14 and 16 of the central portion 12. In the preferred variant, level indicators, see at 40 for central portion 12 and at 42 and 44 in phantom in FIG. 2, are built into at least the central portion and either one or both of the extending wing portions. As illustrated, windowed portions are formed in the sides and top of the central elongated portion 12 within which is seated the level indicator 40 and in order to provide the user with visibility from a number of different angles.

Individual pluralities of semi-circular recesses are defined both within and at spaced apart incremental intervals along both the opposing surfaces of the central elongated portion 12 and the first 20 and second 22 wing portions. Particularly, the central portion 12 includes a plurality of semi-circular recesses 46 defined within the bottom facing and opposing surface 18, the recesses 46 extending between first and second spaced apart faces of the central portion as apparent from the drawings. The first wing portion 20 includes a plurality of semi-circular recesses 48 and the second wing portion 22 a further plurality of semi-circular recesses 50.

Figure 9:
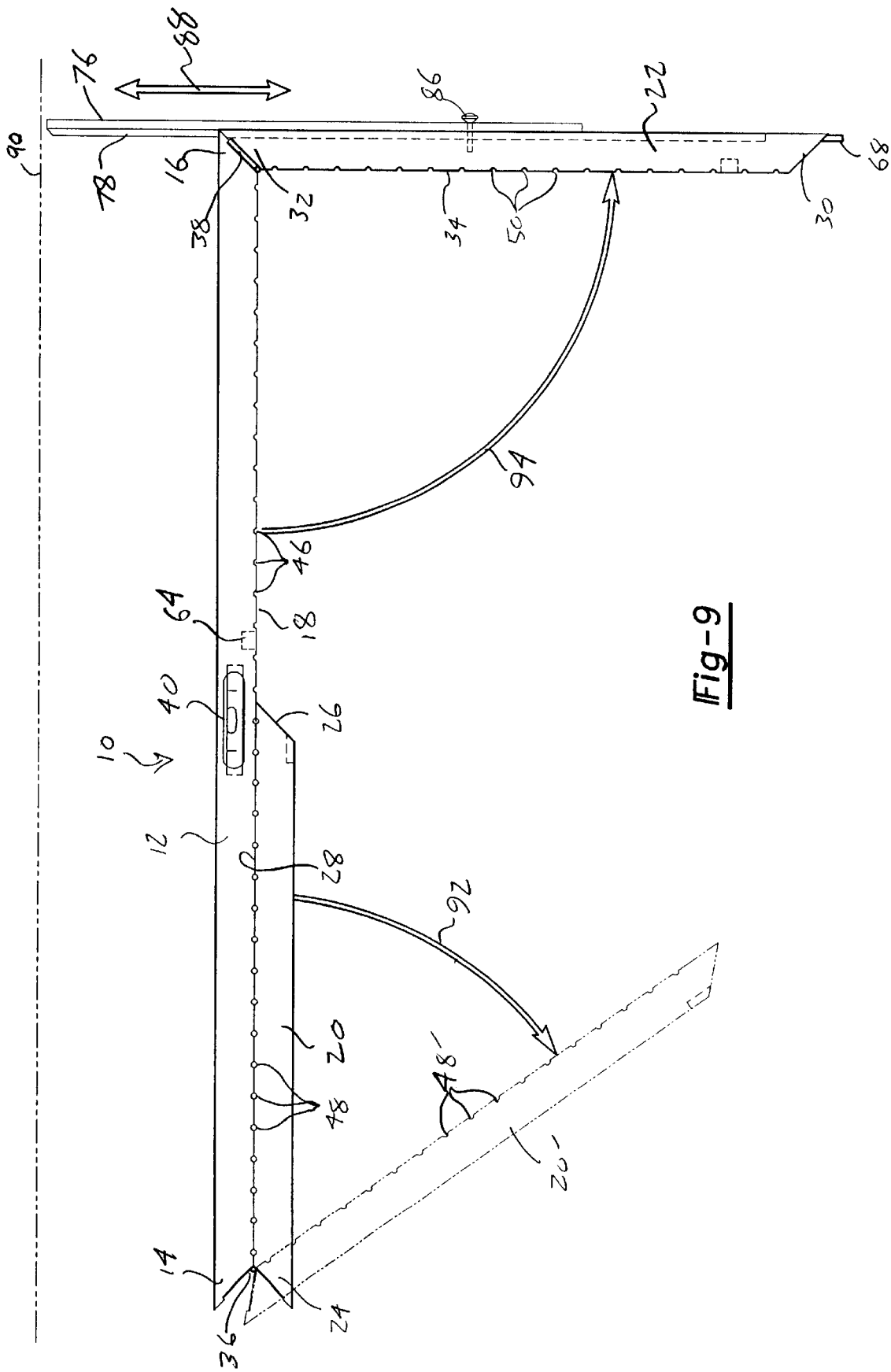
FIG. 9 a plan view illustrating the central leveling portion and first and second pivotally secured wing portions, according to the embodiment of FIG. 1, in a second unfolded and operational position according to the present invention and in which the extensible scale establishes a set level and parallel extending distance of the central portion relative to a ceiling surface.

As best illustrated in FIGS. 2, 5 and 9, the wing portions 20 and 22 establish a first folded position against the central portion 12 and in which the pluralities of semi-circular recesses 46, 48 and 50 align to establish a continuous and extending row of circular apertures. In the preferred embodiment, the apertures extend the overall axial distance of the elongated tool in its folded condition and the apertures are established in one application in a desired spacing of 1" apart and in order to provide a convenient and effective measuring scale. As is also shown in FIG. 2, it is contemplated that additional scale indicia can be placed upon a desired face of the central 12 and side extending wings 20 and 22 and reference is made to scales 52 (central portion 12) and 54 and 56 (wing portions 20 and 22).

In the preferred application, and referring in particular to FIG. 5, the circular apertures achieved by folding the wing portions 20 and 22 against the central portion 12 are adapted to receive mounting fasteners (see screws 58 and 60) in inserting fashion therethrough. In use, an initial stud location of the wall is established by some means conventionally known in the art. At that point, the leveling and marking tool 10 is positioned upon the desired wall covering surface and so that the initial stud location is aligned with a selected one of the circular shaped apertures.

From there, a number of succeeding one inch increments established by the aligning and mating apertures (and with or without the further assistance of the scale indicia 52 and such as again is shown in FIG. 2) are counted off and in order to estimate the location of the next succeeding wall stud or suitable wall support. In the known art, such succeeding and vertically extending wall studs are typically arranged at either 18" or 24" on center locations from each other and, accordingly, the leveling and marking tool can effectively establish the proper locations for the insertion and application of the fasteners 58 and 60, see also drill bit 62 in FIG. 5, and again without having to first dismount the leveling tool from the wall surface.

Referring again to FIGS. 2, 5 and 6 the folded attraction established between the wing portions 20 and 22 and the central extending portion 12 is assisted through the use of magnets incorporated into the opposing surfaces of the central portion and side wing portions. In particular, attracting magnets 64 and 66 are established in planar recessed and opposing fashion between a location of the central portion 20 and that of the second wing portion 22, respectively. Due again to the angular nature of the associated end surface 30 of the second wing 22, relative to that of the opposing surface 26 of the first wing 20, the magnetic inter-attraction of the magnets 64 and 66 causes the wing portion 22 to be adhered against the central portion 12 and, by virtue of the angling ledge contact established between the opposing end surfaces 26 and 30, the wing portion 20 is likewise retained in folding contact against the central portion 12.

Referring again to FIGS. 2, 3 and 9, as well as to the enlarged view of FIG. 8a, a pin and slot engagement is illustrated with, in combination with the angularly configured and mating arrangement of the associated wing portion end surfaces and the use of the magnets 64 and 66, provides additional locating and locking support to the tool. In particular, and as again shown in FIG. 8a, a pin 68 extends axially from a first selected wing portion, see end 30 of wing portion 22, and is engageable within a slotted portion defined within the second selected wing portion, in this case slotted portion 70 defined within a bottom edge of the opposing and angled end 26 of the wing portion 20.

Referring to FIG. 8b, a further variant of the pin and recess design is illustrated and which includes a pin 72 extends in bottom projecting fashion from an axial location of the central portion 12'. The pin 72 seats within a recess 74 defined in an associated and opposing surface of an alternatively configured wing portion 20', and upon folding the wing portion 20' and additional wing portion 22' against the central portion 12'. As is also evident from the illustration of FIG. 8b, opposing end surfaces 26' and 30' of the wing portions 20' and 22' matingly engage against the underside of the central portion 12' (typically first the wing portion 22', following which the portion 20' is engaged) and are thereby supported in adhering fashion.

Referring to FIGS. 3–7 and 9, an elongated scale 76 is provided and is secured in channeled fashion along an extending underside of a selected one of the extending wing portions. In particular, and again referencing the several indicated illustrations, the scale 76 includes a trapezoidal configuration in cross section, see as best shown at 78 in the cutaway of FIGS. 6 and 7, and which fits within a likewise axially extending and mirrored trapezoidal recess 80 defined within the bottom extending surface of the selected wing portion 22.

Referring again to the underside views of FIGS. 3 and 4, the elongated scale 76 includes a plurality of spaced apart apertures 82 extending therethrough in spaced apart fashion. The corresponding underside of the wing portion 22 further includes at least one and possibly also a plurality of apertures, see at 84 in FIG. 4. A dowel pin 86 engages through a selected aperture 82 and an aligning aperture 84, such as in the manner shown in one example in FIG. 4 and in order that the scale be contained in an initial and retracted position. Although not shown, it is further understood that the extensible scale can be provided on a side extending face (as opposed to the bottom face) of the selected wing portion and may also be provided on both wing portions, although such is not required in order to establish a desired fixed separation between the central portion 12 and the corresponding ceiling surface 90.

Referring again to FIG. 9, and upon arraying the selected wing portion 22 in its perpendicular extending fashion, the dowel pin 86 is removed and the scale 76 extended in an upward fashion, see arrow 88, to a desired and incrementally adjusted position, such as which defines a set distance between the central extending portion 12 and a ceiling surface, see in phantom in 90. As again illustrated in FIG. 9, both wing portions 20 and 22 are pivoted downwardly (see arrows 92 and 94, respectively) and so that the wing portions, such as again 20 in phantom designation at 20' and in solid portion at 22, are established in their desired arrayed fashion relative to the central extending portion 12. In this fashion, the perpendicularly arrayed wing portion(s) function to provide additional extending surfaces to mark such as vertical dimensions of a hidden wall stud or suitable wall support.

Referring finally to FIG. 10, a further variant 96 of the tool includes the provision of first 98 and second 100 elongate extending and pivotally secured portions, each of which again exhibits opposing surfaces (see at 102 and 104, respectively) and within which are defined the individual pluralities of semi-circular shaped recesses 106 and 108. Interconnecting ends 110 and 112 of the portions 98 and 100, respectively, are shaped in the same manner as previously illustrated, and once again a hinge 114 is provided for pivotally engaging the elongated portions together.

As before, the elongate portions 98 and 100 establish a first folded position in which the pluralities 106 and 108 of semi-circular recesses align to establish an extending row of circular apertures adapted to receive a mounting fastener in inserting fashion therethrough. The portions 98 and 100 are further pivotable relative to each other in the fashion previously described and to a second unfolded position in which the portions are established in substantially perpendicular extending fashion relative to one another.

As again previously disclosed, an ideal application for this variant of the tool 96 is for use in such as the inside of a cabinet (not shown) and in order to mark locations for the placement of shelving portions and the like. Additional components of the variant 98 include the provision of comprising a level indicator, see 116, incorporated into at least one of the first and second elongate extending portions, in this cases first portion 98.

Attracting magnets 118 and 120 are again incorporated into the opposing surfaces 102 and 104 of the first 98 and second 100 elongate extending portions. Finally, a pin 122 extends from an axial location along the first extending portion 98 and seats within a recess 124 defined in the associated opposing surface 104 of the second extending portion 100 (see also arrow 126) upon folding said first and second portions together.

Having described my invention, additional preferred embodiments will become apparent to those skilled in the art to which it pertains, and without deviating from the scope of the appended claims.

I claim:

1. A combination leveling and marking tool for use in establishing wall support locations existing underneath a wall covering material, said tool comprising:
    a central elongate extending portion having a first end and a second end;
    a first elongate extending wing portion pivotally secured to said first end of said central portion;
    a second elongate extending wing portion pivotally secured to said second end of said central portion;
    said central portion and said first and second wing portions each exhibiting opposing surfaces within which are defined individual pluralities of semi-circular shaped recesses; and
    said wing portions establishing a first folded position against said central portion, in which said pluralities of semi-circular recesses align to establish an extending row of circular apertures which are adapted to receive a mounting fastener in inserting fashion therethrough, said wing portions further pivoting to a second unfolded position in which said wing portions are established in substantially perpendicular extending fashion relative to said central portion.

2. The combination tool as described in claim 1, further comprising a scale secured in channeled fashion along at least one of said first and second elongate extending wing portions, said scale being actuable between a first retracted position and a second extended position relative said associated wing portion.

3. The combination tool as described in claim 2, further comprising a plurality of spaced apart apertures formed through said scale, a dowel pin engaging through a selected aperture and an aligning aperture defined in said associated wing portion to secure said scale at a selected extended position.

4. The combination tool as described in claim 1, further comprising a level indicator incorporated into at least one of said central portion and said first and second wing portions.

5. The combination tool as described in claim 1, further comprising attracting magnets incorporated into said opposing surfaces of said central portion and said first and second wing portions.

6. The combination tool as described in claim 1, further comprising a pin extending axially from a first selected wing portion and engageable within a slotted portion defined within the second selected wing portion.

7. The combination tool as described in claim 1, further comprising a pin extending from an axial location along said central portion and which seats within a recess defined in said associated opposing surface of said wing portion upon folding said wing portion against said central portion.

8. The combination tool as described in claim 1, further comprising first and second hinges for pivotally securing said wing portions to said central portion.

9. The combination tool as described in claim 1, further comprising opposing end surfaces of said first and second wing portions being angularly configured in mating fashion upon being folded against said central portion.

10. The combination tool as described in claim 1, said central portion and said first and second wing portions having a specified shape and size, said individual pluralities of semi-circular shaped recesses being defined in said opposing surfaces at pre-selected intervals.

11. The combination tool as described in claim 10, further comprising said central portion and said first and second wing portions each establishing a substantially rectangular and elongated construction, said individual pluralities of recesses being established at one inch increments.

12. The combination tool as described in claim 1, further comprising a measurement scale imprinted upon a front face of at least one of said central portion and said first and second wing portions.

13. A combination leveling and marking tool for use in establishing wall support locations, said tool comprising:
    at least a first elongate extending portion and a second elongate portion pivotally secured to said first portion;
    said first and second elongate portions each exhibiting opposing surfaces within which are defined individual pluralities of semi-circular shaped recesses; and
    said portions establishing a first folded position in which said pluralities of semi-circular recesses align to establish an extending row of circular apertures which are adapted to receive a mounting fastener in inserting fashion therethrough, said portions further pivoting to a second unfolded position in which said portions are established in substantially perpendicular extending fashion relative to one another.

14. The combination tool as described in claim 13, further comprising a level indicator incorporated into at least one of said first and second elongate extending portions.

15. The combination tool as described in claim 13, further comprising attracting magnets incorporated into said opposing surfaces of said first and second elongate extending portions.

16. The combination tool as described in claim 13, further comprising a pin extending from an axial location along said first extending portion and which seats within a recess defined in said associated opposing surface of said second extending portion upon folding said first and second portions together.

* * * * *